US005215697A

United States Patent [19]

Toki et al.

[11] Patent Number: 5,215,697

[45] Date of Patent: Jun. 1, 1993

[54] METHOD OF FORMING SHAPED BODY FROM FINE PARTICLES WITH CARRIER FLUID UNDER PRESSURE GRADIENT

[75] Inventors: Kazuyuki Toki, Susono; Mikio Murachi, Toyota, both of Japan

[73] Assignee: Toyota Jidosha Kabushiki Kaisha, Japan

[21] Appl. No.: 849,207

[22] Filed: Mar. 11, 1992

[30] Foreign Application Priority Data

Mar. 22, 1991 [JP] Japan .......... 3-83613
Jun. 14, 1991 [JP] Japan .......... 3-169233
Jun. 14, 1991 [JP] Japan .......... 3-169234

[51] Int. Cl.[5] .......... B29C 43/02

[52] U.S. Cl. .......... 264/121; 264/56; 264/517; 419/66

[58] Field of Search .......... 264/56, 86, 517, 109, 264/121, 123; 419/38, 66

[56] References Cited

U.S. PATENT DOCUMENTS

| | | | |
|---|---|---|---|
| 3,165,570 | 1/1965 | Deutsch | 264/121 |
| 4,191,726 | 3/1980 | Stillhard et al. | 264/517 |
| 4,221,752 | 9/1980 | Bray | 264/121 |
| 4,683,118 | 7/1987 | Hayashi et al. | 419/23 |
| 4,731,208 | 3/1988 | Nakajima et al. | 264/37 |
| 4,788,023 | 11/1988 | Buhler et al. | 264/517 |
| 5,028,363 | 7/1991 | Nishio et al. | 264/28 |
| 5,028.374 | 7/1991 | Imao et al. | 264/517 |
| 5,047,185 | 9/1991 | Engel | 264/60 |
| 5,059,112 | 10/1991 | Wieser | 425/546 |
| 5,098,620 | 3/1992 | Bradley | 264/26 |

*Primary Examiner*—Mary Lynn Theisen
*Attorney, Agent, or Firm*—Finnegan, Henderson, Farabow, Garrett & Dunner

[57] ABSTRACT

A shaped body is formed from fine particles such as powder, whiskers or short fibers of ceramics or metal, by preparing a mold having a mold chamber, an inlet port open to the mold chamber at its first portion and adapted to introduce a mixture of the fine particles and a carrier fluid into the mold chamber, and an outlet port open to the mold chamber at its second portion substantially opposite to the first portion and adapted to exhaust substantially only the carrier fluid in a gaseous state out of the mold chamber; preparing the mixture of the fine particles and the carrier fluid; and supplying the mixture under a pressure elevated substantially above atmospheric pressure into the mold chamber through the inlet port while exhausting the carrier fluid out of the mold chamber through the outlet port.

11 Claims, 1 Drawing Sheet

METHOD OF FORMING SHAPED BODY FROM FINE PARTICLES WITH CARRIER FLUID UNDER PRESSURE GRADIENT

BACKGROUND OF THE INVENTION

1. Field of the Invention

The present invention relates to a method of forming a shaped body from fine particles such as powder, whiskers or short fibers of ceramics or metals, by employing a mold having a mold chamber.

2. Description of the Prior Art

It is known to manufacture ceramic or metallic articles from fine particles of the material such as powder, whiskers or short fibers by charging a mixture of the fine particles and a fluidal binder or binding agent into a mold chamber of a mold, compacting the mixture in the mold chamber to follow the shape of the mold chamber, removing the molded body out of the mold, expelling the binding agent out of the molded body, and sintering the fine particles to form an integral body.

In the above article manufacturing processes, the fluidal biding agent has been considered to be indispensable to give a smooth fluidity to a mass of fine particles so that it is readily deformable to fill a mold chamber uniformly up to every corner thereof and also to maintain the shape of the molded body prior to the sintering of the fine particles.

However, the process of expelling the biding agent out of the molded body, which is generally to heat the molded body under ventilation of atmosphere, takes a relatively long time, and further, if the heating is not carried out at an appropriate condition, there is a high probability that an undesirable shrinkage occurs and cracks are generated.

In order to meet with these problems, it has been proposed in Japanese Patent Publication 3-9064 to use a super critical fluid as a binder remover for the mixture of fine particles and a binding agent, noting that a super critical fluid presents a high dissolubility to the biding agent due to its high density, and thus it works as a good extraction agent in expelling the binding agent out of the molded body.

Further, in Japanese Patent Publication 3-12122 it has been proposed to first replace the binding agent in the molded body by a super critical fluid and then to remove the super critical fluid from the molded body, while shifting the super critical state of the fluid directly to a gaseous state without crossing the liquid-gas border line, so that no state of coexistence of liquid and gas is encountered in the micro pores in the molded body, thereby avoiding that the micro structure of the molded body is damaged by the capillary action of the fluid in the micro bores.

SUMMARY OF THE INVENTION

In view of the difficulties concerned with the removal of the binding agent from the molded body as described above, it is the object of the present invention to provide a method of forming a shaped body from fine particles such as powder, whiskers or short fibers of ceramics or metal, without using any binding agent, so that no process of removing the binding agent from the molded body is required.

According to the present invention, the above-mentioned object is accomplished by a method of forming a shaped body from fine particles such as powder, whiskers or short fibers of ceramics or metal, comprising the steps of preparing a mold having a mold chamber, an inlet port open to said mold chamber at a first portion thereof and adapted to introduce a mixture of said fine particles and a carrier fluid into said mold chamber, and an outlet port open to said mold chamber at a second portion thereof substantially opposite to said first portion and adapted to exhaust substantially only said carrier fluid in a gaseous state out of said mold chamber; preparing said mixture of said fine particles and said carrier fluid; and supplying said mixture under a pressure elevated substantially above atmospheric pressure into said mold chamber through said inlet port while exhausting said carrier fluid out of said mold chamber through said outlet port.

When fine particles such as powder, whiskers or short fibers of ceramics or metal are supplied, as mixed with a carrier fluid, under a pressure elevated substantially above atmospheric pressure, into a mold chamber of a mold through an inlet port thereof open to the mold chamber at a first portion thereof, and when the mold has an outlet port open to the mold chamber at a second portion thereof substantially opposite to said first portion and adapted to exhaust substantially only the carrier fluid in a gaseous state out of the mold chamber, a continuous flow of the carrier fluid is generated across the mold chamber from the inlet port to the outlet port, whereby a suspension of the fine particles by the carrier fluid enough to carry the fine particles to every corner in the mold chamber is available, and then, as the carrier fluid which has carried the fine particles is exhausted through the outlet port, the fine particles are gradually stacked up, starting from the location of the outlet port toward the location of the inlet port, forming a tight stack of the fine particles having such a micro structure that each fine particle is most stably received in a micro space afforded by several preceding fine particles and is subsequently pressed among those preceding fine particles by the flow of the carrier fluid as well as a pressure gradient across a succeeding stack of the fine particles. Thus, when the pressure to supply the mixture of the fine particles and the carrier fluid into the mold chamber is appropriately selected, a molded body of the fine particles is available in any reasonable shape to have a high integrity enough to maintain its shape unchanged during the succeeding sintering process.

According to an embodiment of the present invention, said carrier fluid may desirably be at a super critical condition when said mixture is supplied into said mold chamber, said carrier fluid being in a gaseous state at room temperature and atmospheric pressure.

However, said carrier fluid may also be a liquid when said mixture is supplied into said mold chamber, said carrier fluid being in a gaseous state at room temperature and atmospheric pressure.

Further, said carrier fluid may also be a gas at a pressure equal to or higher than 10 $kg/cm^2$ when said mixture is supplied into said mold chamber.

As viewed from another aspect of carrying out the method of the present invention, said mixture may be prepared to be at said elevated pressure in a pressure vessel equipped with a heating means and an agitation means, and is supplied into said mold chamber by the pressure in said pressure vessel.

Alternatively, said mixture may be prepared in a vessel equipped with a heating means and an agitation means, and is supplied from said vessel into said mold chamber through a pump means which compresses said mixture.

$CO_2$ is one of the most desirable materials to be used as said carrier fluid in the method according to the present invention.

However, $N_2$ is also usable when it is used as a gas at a pressure equal to or higher than 10 kg/cm$^2$.

BRIEF DESCRIPTION OF THE DRAWING

In the accompanying drawing.

DESCRIPTION OF THE PREFERRED EMBODIMENTS

In the following the present invention will be described in more detail with respect to some preferred embodiments with reference to the accompanying drawings.

Figure 1:
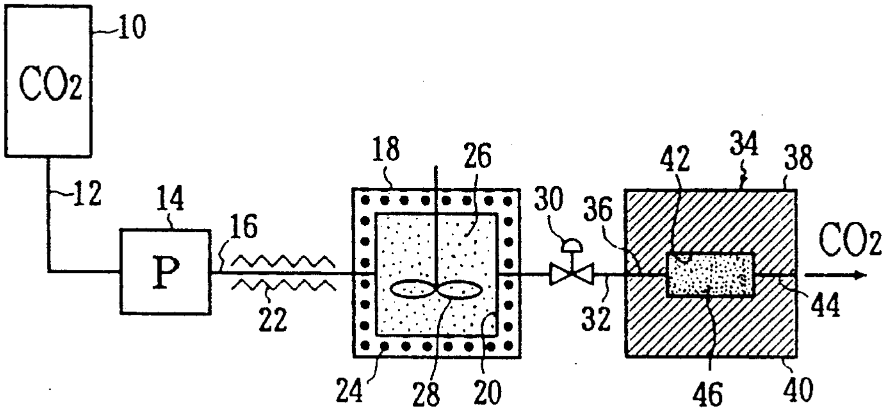
FIG. 1 is a diagrammatical illustration of a device to carry out an embodiment of the present invention.

Referring to FIG. 1, 10 designates a storage container of $CO_2$ which supplies $CO_2$ through a conduit 12, a pump 14 and a conduit 16 to a mixing vessel 18 having a mixing chamber 20. The $CO_2$ is selectively heated by a heater 22 while it is conducted through the conduit 16. The mixing vessel has a heater 24 arranged around the mixing chamber 20 and an agitator 28 for mixing fine particles 26 charged in the mixing chamber 20 and the $CO_2$ introduced into the mixing chamber 20. The mixture of the fine particles and the $CO_2$ is conducted through a shutoff valve 30 and a conduit 32 to a mold 34 through an inlet port 36. The mold 34 is made of an upper mold half 38 and a lower mold half 40 defining in combination a mold chamber 42. A small clearance left between the two mold halves at a location opposite to the inlet port 36 provides an outlet port 44 adapted to pass substantially only gas therethrough.

EXAMPLE 1

A molded body was made from a silicon nitride powder by employing the device shown in FIG. 1.

First, a fine particle material consisting of a silicon nitride powder of 0.4 micron mean particle diameter forming 96 parts in weight, a yttrium oxide powder of 0.2 micron mean particle diameter forming 2 parts in weight and an alumina powder of 0.1 micron mean particle diameter forming 2 parts in weight was charged into the mixing chamber 20.

Then, with the shutoff valve 30 being kept closed, the mold chamber space was heated by the heater 24 up to 35° C., which is higher than the critical temperature 31.1° C. of $CO_2$. Then, operating the pump 14, opening a port valve (not shown in FIG. 1) of the storage container 10, and operating the heater 22, $CO_2$ from the storage container 10 was charged into the mixing chamber 20 until the pressure in the mixing chamber 20 reached 400 atm, which is higher than the critical pressure 73.8 atm of $CO_2$, thus rendering the $CO_2$ in the mixing chamber 20 in a super critical state.

The agitator 28 was also operated to mix the fine particles with the super critical $CO_2$, thus suspending the fine particles in turbulent flows of the $CO_2$. Then, opening the shutoff valve 30, the mixture was supplied from the mixing vessel into the mold chamber 42 through the inlet port 36. In the meantime, $CO_2$ gas was exhausted from the outlet port 44. When the mold chamber 42 was completely filled with a stack of the fine particles forming a body 46, the shutoff valve 30 was closed, and all of the heaters 22 and 24, the pump 14 and the agitator 28 were stopped.

Although it was unable to see the behaviour of the fine particles and the super critical $CO_2$ in the mold chamber 42, it is guessed that, as a part of the super critical $CO_2$ existing adjacent the outlet port 44 in the mold chamber 42 is exhausted through the outlet port 44 while changing its state into a gas, the fine particles suspended by such part of the $CO_2$ were laid around the outlet port 44 to form a layer of stacked fine particles, and then, as the thickness of the stack layer gradually increased, it provided a flow resistance layer against the flowing out of the $CO_2$ in the mold chamber through the outlet port 44, thereby generating a pressure gradient across the stack layer toward the outlet port, successively letting each fine particle be most stably received in each micro space afforded by several preceding fine particles already formed into the stack layer, by the force generated according to the pressure gradient, or the flow of $CO_2$ and the compression of the stack layer exerted thereby.

Figure 2:
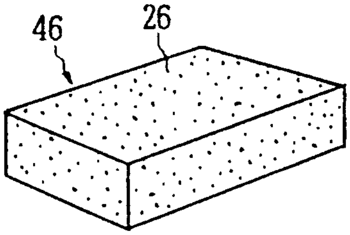
FIG. 2 is an example of a molded body of fine particles produced by the device shown in FIG. 1.

After the completion of the above molding operation, the mold halves were opened and the molded body 46 in the form of a rectangular parallelopiped block such as shown in FIG. 2 was obtained. The block had three dimensions precisely coinciding with those of the mold chamber 42. There was no shrinkage and no crack in the block.

The density and the bending strength of the molded body 46 were tested. The density was substantially uniform over all portions thereof and was 1.50 g/cm$^3$, presenting a volumetric density of 48%. The molded body was firm enough to maintain its shape for subsequent sintering process. It was confirmed that no $CO_2$ remained in the molded body.

EXAMPLE 2

Figure 3:
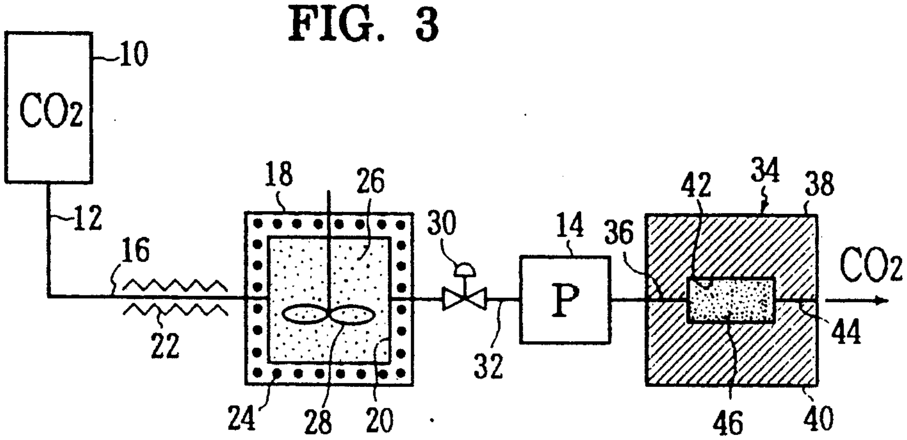
FIG. 3 is a view similar to FIG. 1, showing another embodiment of the present invention.

The device was modified as shown in FIG. 3 so that the pump 14 is positioned in the conduit 32 and can supply a mixture of fine particles and a carrier fluid prepared in the mixing vessel 18 into the molding chamber 42 under a compression applied thereby.

A mixture of 10 kg silicon nitride powder of 0.5 micron mean particle diameter, 500 g yttrium oxide of 0.1 micron mean particle diameter and 500 g alumina powder of 0.1 micron mean particle diameter was charged into the mixing chamber 20 of the mixing vessel 18. Then, with the shutoff valve 30 being kept closed, $CO_2$ was supplied into the mixing chamber 20 at 5 kg/cm$^2$. Then, operating the heater 24, while also operating the agitator 28, the mixing chamber space was heated so that the temperature rised up to 80° C. and the pressure rised up to 120 kg/cm$^2$, thus rendering the $CO_2$ in a super critical state.

Then, opening the shutoff valve 30, while operating the pump 14, the mixture of the fine particles and the super critical $CO_2$ was pumped up to 300 kg/cm$^2$ and supplied to the mold chamber 20. The supply of the mixture under the pumping was continued, while allowing $CO_2$ gas to exhaust through the outlet port 44, until the mold chamber 20 was completely filled with a stack of the fine particles. Then, the shutoff valve 30 was closed, and the pump 14 was stopped. Then, the mold halves were opened, and the mold body 46 was taken out.

For the sake of comparison, several molded bodies were produced from the same mixture but without operating the pump 14, so that the pressure of supplying the mixture into the mold chamber 42 gradually lowered according to the consumption of the mixture in the mixture vessel 18.

The difference in density of the molded body according to the mixture supply pressure in the mold chamber was as follows:

| Pressure ($kg/cm^2$) | Density ($g/cm^3$) |
|---|---|
| 300 | 1.40 |
| 120 | 1.31 |
| 112 | 1.29 |
| 103 | 1.27 |
| 95 | 1.24 |
| 86 | 1.22 |
| 78 | 1.20 |

The molded body produced by the mixture supply pressure of 300 $kg/cm^2$ and the molded body produced by the mixture supply pressure of 95 $kg/cm^2$ were sintered in N2 atmosphere at 1700° C. for 4 hours. The density of the sintered bodies was measured. Further, 40 samples for the bending test according to JIS R1601 were produced from each molded body, and were tested. The mean values of the density, the strength and the Weibull coefficient with respect to the samples obtained under the pressures of 300 $kg/cm^2$ and 95 $kg/cm^2$ were respectively as follows:

| Pressure | Density | Strength | Weibull coefficient |
|---|---|---|---|
| 300 $kg/cm^2$ | 3.27 $g/cm^3$ | 1260 MPa | 16 |
| 95 $kg/cm^2$ | 3.22 $g/cm^3$ | 920 MPa | 7 |

EXAMPLE 3

A mixture of 10 kg silicon nitride powder of 0.5 micron mean particle diameter, 500 g yttrium oxide powder of 0.1 micron mean particle diameter and 500 g alumina powder of 0.2 micron mean particle diameter was charged into the mixing chamber 20 of the mixing vessel in the device shown in FIG. 3. Then, with the shutoff valve 30 being kept closed, $CO_2$ under pressure was charged into the mixing chamber 20. The pressure and the temperature in the mixing chamber space were adjusted to be 100 $kg/cm^2$ and 23° C., respectively, so that the CO2 was in a liquid state. The amount of CO2 charged in the mixing chamber 20 was 3.5 kg.

After full agitation of the mixture by the agitator 28, opening the shutoff valve 30, while operating the pump 14, the mixture was pumped up to 200 $kg/cm^2$ and supplied into the mold chamber 42. The pumping supply of the mixture into the mold chamber was continued, while $CO_2$ gas was exhausted through the outlet port 44, until the mold chamber 42 was completely filled with a stack of the fine particles. Then, the shutoff valve was closed, the pump 14 was stopped, and the molded body was taken out from the mold in the same rectangular parallelopiped block form.

The molded body showed three dimensions precisely coinciding with those of the mold chamber 42. The density was 1.37 $g/cm^3$. No $CO_2$ remained in the molded body.

The molded body was sintered in $N_2$ atmosphere at 1750° C. for 4 hours. 40 samples for the bending test according to JIS R1601 were produced from the sintered body, and tested. The mean values of the strength and the Weibull coefficient were 1210MPa and 14, respectively.

EXAMPLE 4

A mixture of 10 kg silicon nitride powder of 0.4 micron mean particle diameter, 500 g yttrium oxide powder of 0.1 micron mean particle diameter and 500 g alumina powder of 0.2 micron mean particle diameter was charged into the mixing chamber 20 of the mixing vessel in the device shown in FIG. 3. Then, with the shutoff valve 30 being kept closed, $CO_2$ was charged into the mixing chamber 20. The pressure and the temperature in the mixing chamber space were adjusted to be 5 $kg/cm^2$ and 23° C., respectively, so that the CO2 was in a gaseous state.

After full agitation of the mixture by the agitator 28, opening the shutoff valve 30, while operating the pump 14, the mixture was pumped up to various pressures between 5–60 $kg/cm^2$ and supplied into the mold chamber 42 to produce several kinds of samples. For each kind of samples, the pumping supply of the mixture into the mold chamber was continued, while the $CO_2$ gas was exhausted through the outlet port 44, until the mold chamber 42 was completely filled with a stack of the fine particles. Then, the shutoff valve was closed, the pump 14 was stopped, and the molded body was taken out from the mold in the same rectangular parallelopiped block form. In this manner, several molded bodies were produces at different mixture supply pressures.

The shape and the dimensions of the molded bodies were inspected. As a result, it was confirmed that the molded bodies produced under the mixture supply pressure at or higher than 10 $kg/cm^2$ showed dimensions precisely coinciding with those of the mold chamber, and had no shrunk or cracked portion. On the other hand, the molded body produced at 5 $kg/cm^2$ was broken before it was taken out from the mold. The molded body produced at 8 $kg/cm^2$ could be taken out from the mold but was too fragile to be used.

The density variation according to the mixture supply pressure was as follows:

| Pressure ($kg/cm^2$) | Density ($g/cm^3$) |
|---|---|
| 60 | 1.25 |
| 40 | 1.19 |
| 20 | 1.10 |
| 10 | 0.98 |
| 8 | not available |
| 5 | not available |

Similar results were obtained when the molded bodies were produced by using $N_2$ gas instead of $CO_2$ gas. Further, similar results were obtained when a silicon carbide powder of 0.5 micron mean particle diameter was used instead of the silicon nitride powder of 0.4 micron means particle diameter.

From the foregoing it will be appreciated that according to the present invention molded bodied of fine particles such as powder, whiskers or short fibers of ceramics or metal to be turned into integral ceramic or metallic articles by a subsequent sintering process are obtained to have a shape and dimensions defined by a mold chamber at high fidelity, with no use of binding agent, thereby obviating the difficulties concerned with expelling the binding agent from the molded bodies. Therefore, a high productivity is available in the manufacture of shaped articles of ceramics or metal starting from fine particles of the material.

Although the invention has been described with respect to some preferred embodiments thereof, it will be clear to those skilled in the art that various changes or modifications are possible without departing from the spirit of the present invention.

We claim:

1. A method of forming a shaped body from fine particles of ceramics or metal, comprising the steps of preparing a mold having a mold chamber, an inlet port open to said mold chamber at a first portion thereof and adapted to introduce a mixture of said fine particles and a carrier fluid into said mold chamber, and an outlet port open to said mold chamber at a second portion thereof substantially opposite to said first portion and adapted to exhaust substantially only said carrier fluid in a gaseous state out of said mold chamber; preparing said mixture of said fine particles and said carrier fluid; and supplying said mixture under a pressure elevated substantially above atmospheric pressure into said mold chamber through said inlet port while exhausting said carrier fluid out of said mold chamber through said outlet port, wherein said carrier fluid is at a super critical condition when said mixture is supplied into said mold chamber, said carrier fluid being in a gaseous state at room temperature and atmospheric pressure.

2. A method according to claim 1, wherein said mixture is prepared at said elevated pressure in a pressure vessel equipped with a heating means and an agitation means, and is supplied into said mold chamber by the pressure in said pressure vessel.

3. A method according to claim 2, wherein said mixture is prepared in a vessel equipped with a heating means and an agitation means, and is supplied from said vessel into said mold chamber through a pump means which compresses said mixture.

4. A method according to claim 1, wherein said carrier fluid is $CO_2$.

5. A method of forming a shaped body from fine particles of ceramics or metal, comprising the steps of preparing a mold having a mold chamber, an inlet port open to said mold chamber at a first portion thereof and adapted to introduce a mixture of said fine particles and a carrier fluid into said mold chamber, and an outlet port open to said mold chamber at a second portion thereof substantially opposite to said first portion and adapted to exhaust substantially only said carrier fluid in a gaseous state out of said mold chamber; preparing said mixture of said fine particles and said carrier fluid; and supplying said mixture under a pressure elevated substantially above atmospheric pressure into said mold chamber through said inlet port while exhausting said carrier fluid out of said mold chamber through said outlet port, wherein said carrier fluid is a liquid when said mixture is supplied into said mold chamber, said carrier fluid being in a gaseous state at room temperature and atmospheric pressure.

6. A method according to claim 5, wherein said carrier fluid is $CO_2$.

7. A method according to claim 5, wherein said mixture is prepared in a vessel equipped with a heating means and an agitation means, and is supplied from said vessel to said mold chamber through a pump means which compresses said mixture.

8. A method of forming a shaped body from fine particles of ceramics or metal, comprising the steps of preparing a mold having a mold chamber, an inlet port open to said mold chamber at a first portion thereof and adapted to introduce a mixture of said fine particles and a carrier fluid into said mold chamber, and an outlet port open to said mold chamber at a second portion thereof substantially opposite to said first portion and adapted to exhaust substantially only said carrier fluid in a gaseous state out of said mold chamber; preparing said mixture of said fine particles and said carrier fluid; and supplying said mixture under a pressure elevated substantially above atmospheric pressure into said mold chamber through said inlet port while exhausting said carrier fluid out of said mold chamber through said outlet port, wherein said carrier fluid is a gas at a pressure equal to or higher than 10 $kg/cm^2$ when said mixture is supplied into said mold chamber.

9. A method according to claim 8, wherein said carrier fluid is $CO_2$.

10. A method according to claim 8, wherein said carrier fluid is N2.

11. A method according to claim 8, wherein said mixture is prepared in a vessel equipped with a heating means and an agitation means, and is supplied from said vessel into said mold chamber through a pump means which compresses said mixture.

* * * * *